United States Patent
Styles et al.

(10) Patent No.: US 8,925,527 B2
(45) Date of Patent: Jan. 6, 2015

(54) CHARGE AIR COOLER (CAC) CORROSION REDUCTION UTILIZING GRILLE SHUTTERS

(71) Applicant: Ford Global Technologies, LLC, Dearborn, MI (US)

(72) Inventors: Daniel Joseph Styles, Canton, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 157 days.

(21) Appl. No.: 13/656,524

(22) Filed: Oct. 19, 2012

(65) Prior Publication Data

US 2014/0109880 A1 Apr. 24, 2014

(51) Int. Cl.
   *F02M 15/00* (2006.01)
(52) U.S. Cl.
   USPC .............. 123/542; 123/41.01; 123/41.04; 123/41.05; 123/41.06; 123/41.07
(58) Field of Classification Search
   USPC .............. 123/542, 41.01; 361/690, 695
   See application file for complete search history.

(56) References Cited

U.S. PATENT DOCUMENTS

| | | | |
|---|---|---|---|
| 6,301,887 B1 | 10/2001 | Gorel et al. | |
| 6,367,256 B1 | 4/2002 | McKee | |
| 6,408,831 B1 * | 6/2002 | Craig et al. | 123/542 |
| 6,681,171 B2 | 1/2004 | Rimnac et al. | |
| 7,424,868 B2 | 9/2008 | Reckels et al. | |
| 7,533,651 B2 | 5/2009 | Surnilla | |
| 7,707,991 B2 | 5/2010 | Miyanaga et al. | |
| 7,886,724 B2 | 2/2011 | Tai et al. | |
| 8,020,536 B2 * | 9/2011 | Kardos | 123/542 |
| 2003/0217733 A1 | 11/2003 | Shiraishi et al. | |
| 2006/0095178 A1 * | 5/2006 | Guilfoyle et al. | 701/36 |
| 2010/0078001 A1 | 4/2010 | Kolmanovsky et al. | |
| 2011/0053735 A1 * | 3/2011 | Lewis et al. | 477/99 |
| 2011/0094219 A1 * | 4/2011 | Palm | 60/599 |
| 2011/0094482 A1 * | 4/2011 | Weber et al. | 123/568.12 |
| 2011/0137530 A1 | 6/2011 | Kerns | |

(Continued)

FOREIGN PATENT DOCUMENTS

| | | |
|---|---|---|
| EP | 1918546 A1 | 5/2008 |
| WO | 9219851 A2 | 11/1992 |
| WO | 2007126372 A1 | 11/2007 |
| WO | 2010090866 A2 | 8/2010 |

OTHER PUBLICATIONS

Glugla, Chris Paul, "Charge Air Cooler Condensation Control," U.S. Appl. No. 13/621,696, filed Sep. 17, 2012, 33 pages.

(Continued)

*Primary Examiner* — Lindsay Low
*Assistant Examiner* — Omar Morales
(74) *Attorney, Agent, or Firm* — Julia Voutyras; Alleman Hall McCoy Russell & Tuttle LLP (57) ABSTRACT

Methods and systems are provided for reducing corrosion of a charge air cooler and preventing engine misfire due to condensate formation. In response to a condensate forming region in a charge air cooler, a grille shutter system is adjusted, moving the condensate region to a different location in the charge air cooler. Grille shutter orientation may also be controlled in response to vehicle operating conditions and condensate-forming weather conditions.

20 Claims, 7 Drawing Sheets

(56) References Cited

U.S. PATENT DOCUMENTS

2011/0246023 A1 10/2011 Lockwood et al.
2011/0303187 A1 12/2011 Sasaki
2012/0158228 A1 6/2012 Biondo et al.

OTHER PUBLICATIONS

Glugla, Chris Paul, "Charge Air Cooler Condensate Purging Cycle," U.S. Appl. No. 13/658,854, filed Oct. 10, 2012, 62 pages.

Glugla, Chris Paul et al., "Condensation Control in a Charge Air Cooler by Controlling Charge Air Cooler Temperature," U.S. Appl. No. 13/664,248, filed Oct. 30, 2012, 49 pages.

Glugla, Chris Paul et al., "Method for Purging Condensate from a Charge Air Cooler," U.S. Appl. No. 13/656,511, filed Oct. 19, 2012, 48 pages.

Surnilla, Gopichandra et al., "Engine Control Coordination with Grille Shutter Adjustment and Ambient Conditions," U.S. Appl. No. 13/656,542, filed Oct. 19, 2012, 33 pages.

Glugla, Chris Paul et al., "Engine Control System and Method," U.S. Appl. No. 13/656,560, filed Oct. 19, 2012, 50 pages.

Glugla, Chris Paul et al., "Engine Control System and Method," U.S. Appl. No. 13/656,567, filed Oct. 19, 2012, 49 pages.

Styles, Daniel Joseph et al., "Engine Cooling Fan to Reduce Charge Air Cooler Corrosion," U.S. Appl. No. 13/656,471, filed Oct. 19, 2012, 44 pages.

* cited by examiner

CHARGE AIR COOLER (CAC) CORROSION REDUCTION UTILIZING GRILLE SHUTTERS

BACKGROUND AND SUMMARY

Turbo charged engines utilize a Charge Air Cooler (CAC) to cool compressed air from the turbocharger, before it enters the engine. Ambient air from outside the vehicle travels across the CAC to cool intake air passing through the inside of the CAC. Condensate may form in the CAC when the ambient air temperature decreases, or during humid or rainy weather conditions, where the intake air is cooled below the water dew point. When the intake air includes recirculated exhaust gasses, the condensate can become acidic and corrode the CAC housing. The corrosion can lead to leaks between the air charge, the atmosphere, and possibly the coolant in the case of water-to-air coolers. Condensate may collect at the bottom of the CAC, and then be drawn into the engine at once during acceleration increasing the chance of engine misfire.

Other attempts to address condensate formation include restricting intake air travelling through the CAC or restricting ambient air flow to the CAC. One example approach is shown by Craig et al. in U.S. Pat. No. 6,408,831. Therein, the intake air temperature is controlled by an ambient air flow restriction system and an intake air flow restriction system. A controller defines the position of these restriction devices and is connected to a plurality of sensors which measure different variables such as ambient air and intake air temperatures.

However, the inventors herein have recognized potential issues with such systems. Specifically, the above control of restriction devices in response to intake or ambient air temperature may reduce the overall level of condensate, while potentially increasing the concentration of acid in the condensate that does form. Maintaining temperatures at a certain level such that condensate formation is low may result in sustaining a flow restriction for a period of time. This keeps the CAC effectiveness at one level, causing the dew point to hover at one location in the CAC. This may result in an increased acid concentration at one location, actually creating a higher corrosion risk. This is because the corrosion risk is most severe at the location in the CAC where the charge air temperature drops below the dew point and water begins to condense, creating the highly concentrated water and acid solution, especially if the level of condensate it kept low.

In one example, the issues described above may be addressed by a method for controlling vehicle grille shutters, comprising: adjusting grille shutter opening in response to a condensate location in a charge air cooler remaining within a positional range for greater than a threshold duration. The grille shutters may be adjusted to move the condensate location toward an inlet of the charge air cooler (e.g., increase shutter opening) during a first set of conditions, and may be adjusted to move the condensate location toward an outlet (e.g., decrease shutter opening) during a second, different, set of conditions. In this way, by moving the location of the condensate formation, e.g., back and forth, if the location becomes stagnant, it is possible to reduce corrosion risk at any given location from the inlet to the outlet of the charge air cooler, as one example.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
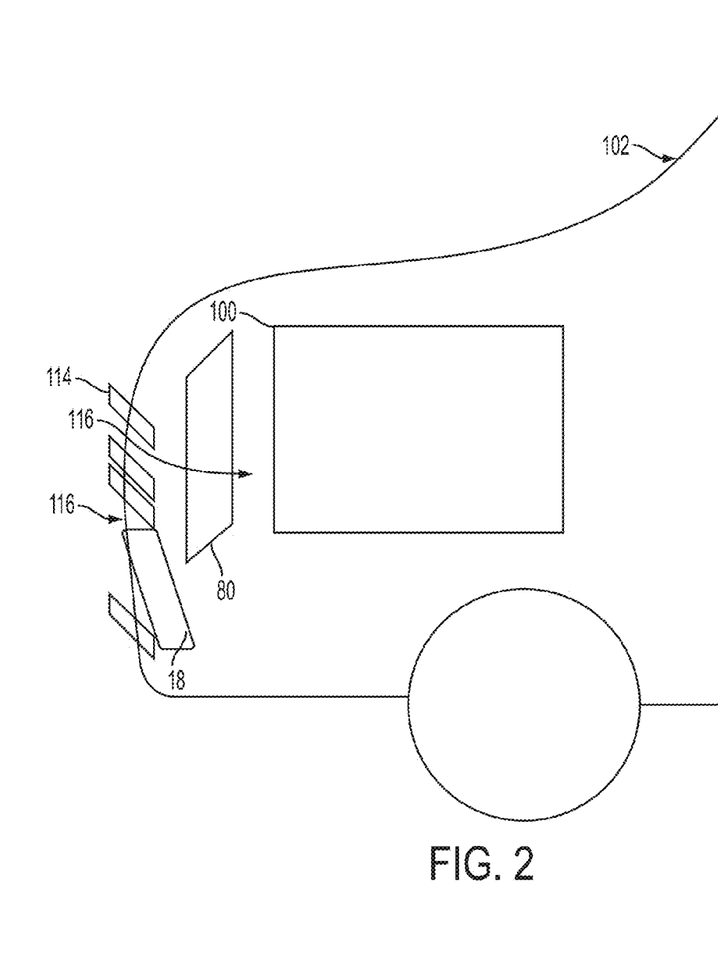
FIG. 2 shows an example of the CAC, radiator, and engine location within a vehicle with respect to the grille shutters and associated ambient air flow.
Figure 3:
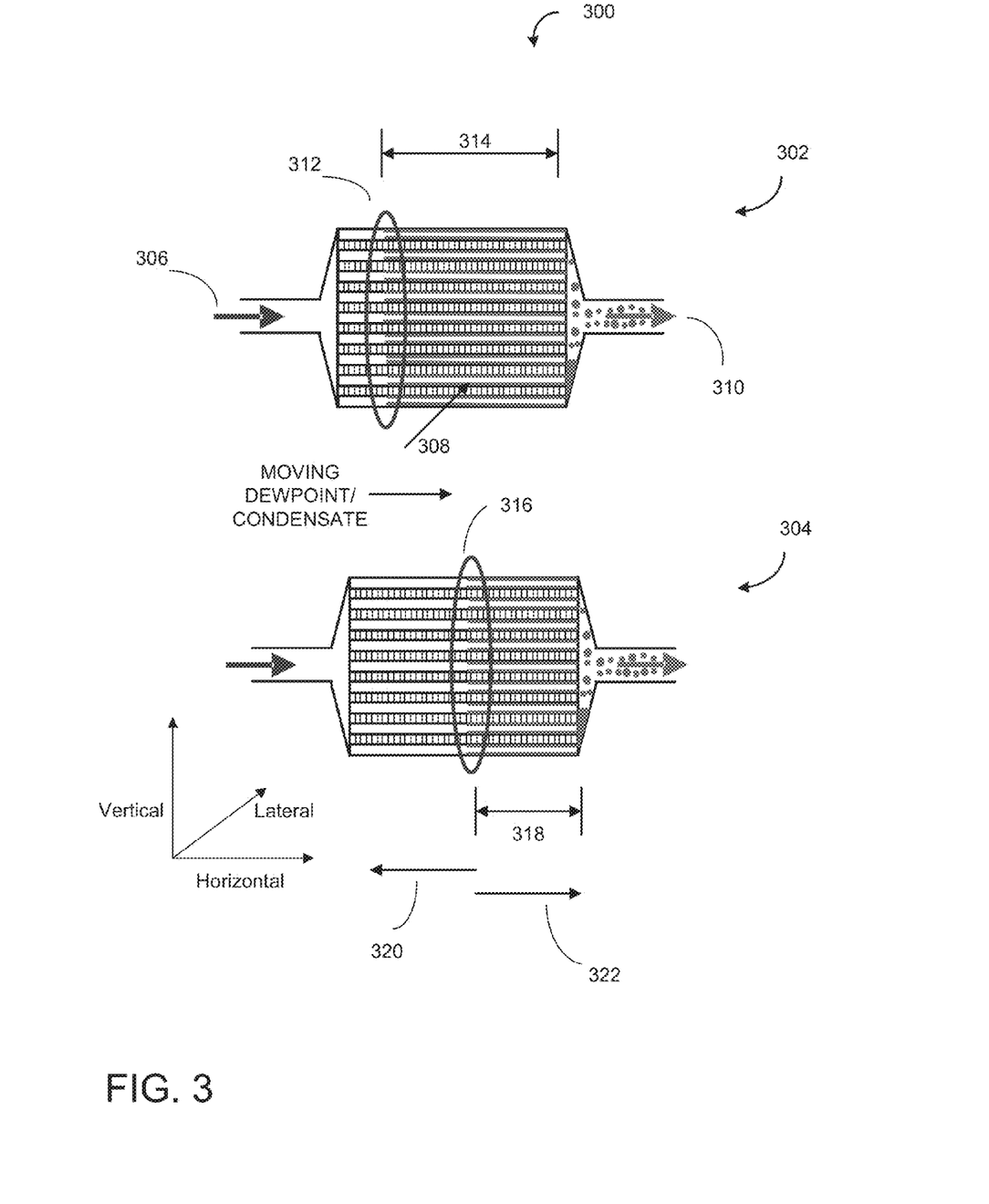
FIG. 3 shows a schematic example of the dew point location and movement within the CAC.

The following description relates to systems and methods for adjusting vehicle grille shutters in response to engine cooling parameters, condensate formation in a CAC, and non-driven vehicle conditions. Grille shutter operation for a vehicle engine system, such as the engine system in FIG. 1, may increase engine cooling, reduce condensate formation in the CAC, and optimize vehicle fuel economy. Opening of the grille shutters, such as those shown in FIG. 2, increases air flow through the vehicle front end, supplying cooling air flow to a radiator and CAC. Adjusting air flow to the CAC, via grille shutters, may change the efficiency of the CAC by moving the dew point location (such as shown in FIG. 3), thus reducing corrosion. An engine controller may be configured to perform a control routine, such as the routine of FIG. 4-6, to adjust grille shutter opening based on a non-driven vehicle condition, condensate formation in the CAC, outside weather conditions, and engine temperatures. In this way, condensate formation, CAC corrosion, and engine misfire can be reduced. Example grille shutter adjustments in response to engine coolant temperature, vehicle speed, condensate formation, and outside weather conditions are described with reference to FIG. 7.

Figure 1:
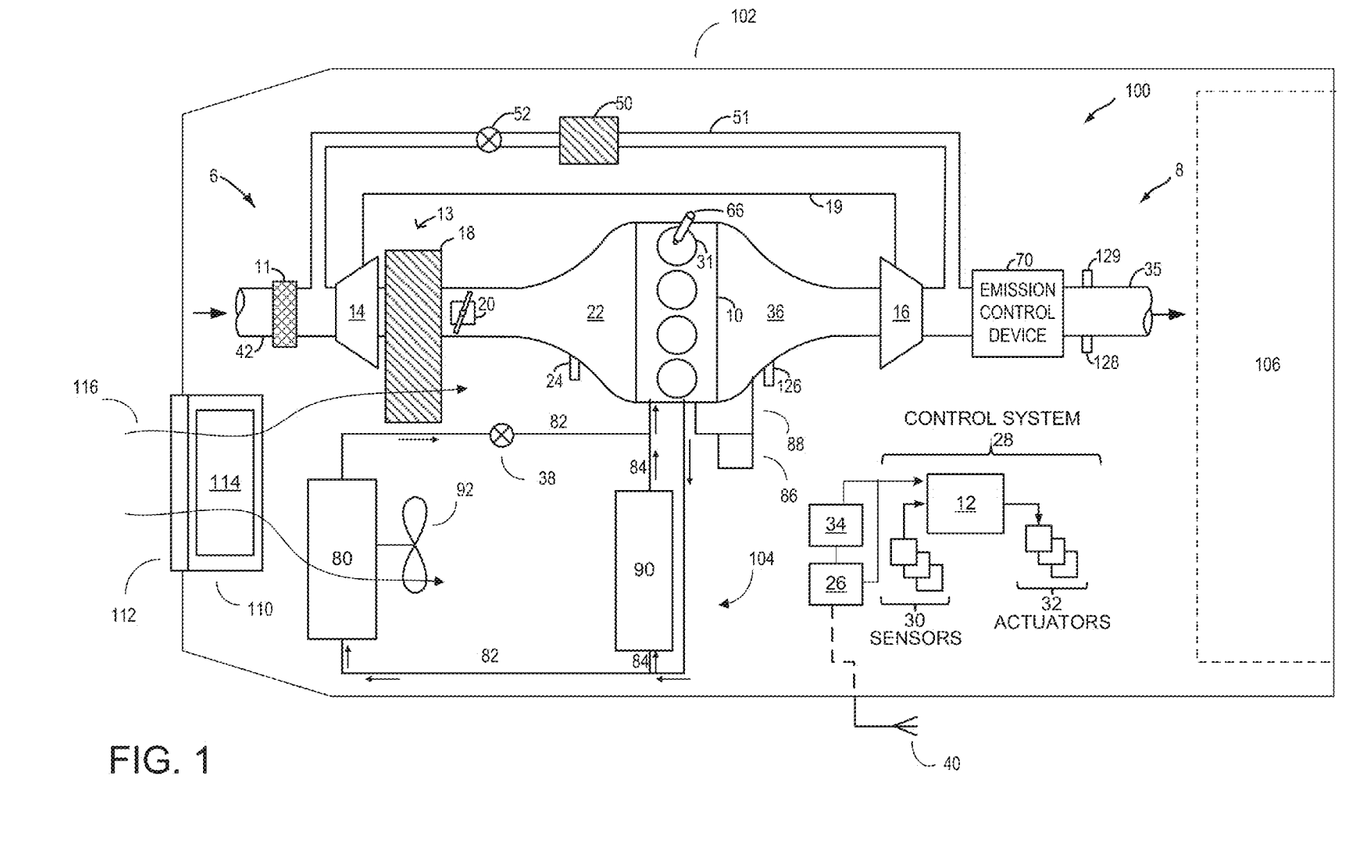
FIG. 1 shows a schematic diagram of a grille shutter system, engine, and associated components in a vehicle.

FIG. 1 shows an example embodiment of a grille shutter system 110 and an engine system 100, in a motor vehicle 102, illustrated schematically. Engine system 100 may be included in a vehicle such as a road vehicle, among other types of vehicles. While the example applications of engine system 100 will be described with reference to a vehicle, it should be appreciated that various types of engines and vehicle propulsion systems may be used, including passenger cars, trucks, etc.

In the depicted embodiment, engine 10 is a boosted engine coupled to a turbocharger 13 including a compressor 14 driven by a turbine 16. Specifically, fresh air is introduced along intake passage 42 into engine 10 via air cleaner 11 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 16 via a shaft 19, the turbine 16 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through charge air cooler (CAC) 18 to throttle valve 20. Throttle valve 20 is coupled to engine intake manifold 22. From the compressor, the compressed air charge flows through the charge air cooler and the throttle valve to the intake manifold. The charge air cooler may be an air-to-air or air-to-water heat exchanger, for example. In the embodiment shown in FIG. 1, the pressure of the air charge within the intake manifold is sensed by manifold air pressure (MAP) sensor 24. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 22 is coupled to a series of combustion chambers 31 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold section may enable effluent from different combustion chambers to be directed to different locations in the engine system.

As shown in FIG. 1, exhaust from the one or more exhaust manifold sections is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, one or more emission control devices 70 may include one or more exhaust after-treatment catalysts configured to catalytically treat the exhaust flow, and thereby reduce an amount of one or more substances in the exhaust flow.

All or part of the treated exhaust from emission control device 70 may be released into the atmosphere via exhaust conduit 35. Depending on operating conditions, however, some exhaust may be diverted instead to EGR passage 51, through EGR cooler 50 and EGR valve 52, to the inlet of compressor 14. In this manner, the compressor is configured to admit exhaust tapped from downstream of turbine 16. The EGR valve may be opened to admit a controlled amount of cooled exhaust gas to the compressor inlet for desirable combustion and emissions-control performance. In this way, engine system 100 is adapted to provide external, low-pressure (LP) EGR. The rotation of the compressor, in addition to the relatively long LP EGR flow path in engine system 100, provides excellent homogenization of the exhaust gas into the intake air charge. Further, the disposition of EGR take-off and mixing points provides effective cooling of the exhaust gas for increased available EGR mass and improved performance.

Motor vehicle 102 further includes a cooling system 104 that circulates coolant through internal combustion engine 10 to absorb waste heat and distributes the heated coolant to radiator 80 and/or heater core 90 via coolant lines 82 and 84, respectively. In particular, FIG. 1 shows cooling system 104 coupled to engine 10 and circulating engine coolant from engine 10 to radiator 80 via engine-driven water pump 86, and back to engine 10 via coolant line 82. Engine-driven water pump 86 may be coupled to the engine via front end accessory drive (FEAD) 88, and rotated proportionally to engine speed via belt, chain, etc. Specifically, engine-driven water pump 86 circulates coolant through passages in the engine block, head, etc., to absorb engine heat, which is then transferred via the radiator 80 to ambient air. In an example where engine-driven water pump 86 is a centrifugal pump, the pressure (and resulting flow) produced may be proportional to the crankshaft speed, which in the example of FIG. 1, is directly proportional to engine speed. In another example, a motor-controlled pump may be used that can be adjusted independently of engine rotation. The temperature of the coolant may be regulated by a thermostat valve 38, located in the cooling line 82, which may be kept closed until the coolant reaches a threshold temperature. Further, a fan 92 may be coupled to radiator 80 in order to maintain airflow through radiator 80 when vehicle 102 is moving slowly or stopped while the engine is running. In some examples, fan speed may be controlled by a controller 12 described in more detail hereafter. Alternatively, fan 92 may be coupled to the engine accessory drive system, driven by the engine crankshaft.

Coolant may flow through coolant line 82, as described above, and/or through coolant line 84 to heater core 90 where the heat may be transferred to passenger compartment 106, and the coolant flows back to engine 10. In some examples, engine-driven water pump 86 may operate to circulate the coolant through both coolant lines 82 and 84.

FIG. 1 further shows a control system 28. Control system 28 may be communicatively coupled to various components of engine system 100 to carry out the control routines and actions described herein. For example, as shown in FIG. 1, control system 28 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 30, which may include user inputs and/or sensors (such as transmission gear position, gas pedal input, brake input, transmission selector position, vehicle speed, engine speed, mass airflow through the engine, ambient temperature, ambient humidity, intake air temperature, fan speed, etc.), cooling system sensors (such as coolant temperature, fan speed, passenger compartment temperature, ambient humidity, etc.), CAC 18 sensors (such as CAC inlet air temperature and pressure, CAC outlet air temperature and pressure, etc.), and others. In addition, controller 12 may receive data from the GPS 34 and/or an in-vehicle communications and entertainment system 26 of vehicle 102.

The in-vehicle communications and entertainment system 26 may communicate with a wireless communication device 40 via various wireless protocols, such as wireless networks, cell tower transmissions, and/or combinations thereof. Data obtained from the in-vehicle communications and entertainment system 26 may include real-time and forecasted weather conditions. Weather conditions, such as temperature, precipitation (e.g., rain, snow, hail, etc.) and humidity, may be obtained through various wireless communication device applications and weather-forecasting websites. Data obtained from the in-vehicle communications and entertainment system may include current and predicted weather conditions for the current location, as well as future locations along a planned travel route. In one embodiment, where the in-vehicle communications and entertainment system includes a GPS, current and future weather data may be correlated with current and future travel routes displayed on the GPS. In an alternate embodiment, wherein the vehicle system includes a dedicated GPS 34, each of the GPS and the in-vehicle communications and entertainment system may communicate with the wireless communication device 40, as well as with each other, to communicate current and future weather data with current and future travel routes. In one example, the entertainment system may access various weather maps stored on the internet or other cloud computing systems. The stored weather maps may include rain, humidity, precipitation and/or temperature information provided as contour maps, for example. In one example, the wireless communication device 40 may relay real-time humidity data to the in-vehicle communications and entertainment system 26, and/or GPS 34, which is then relayed to the controller 12. The controller 12 compares the received humidity data to threshold values and determines the appropriate grille shutter adjustment. For example, if humidity is greater than a defined threshold, one or more of the grille shutters may be closed.

In addition to receiving humidity data from the in-vehicle communications and entertainment system 26 and GPS 34, controller 12 may receive humidity data from alternative or additional sensors. These may include humidity sensors or humidity measurements from an intake $O_2$ sensor. Controller 12 may also infer humidity from a plurality of sensors or vehicle system signals. These may include rain sensors, wiper on/off signals, or a universal exhaust gas oxygen (UEGO) sensor and system during a deceleration fuel shut off (DFSO). The controller may use one or more of these sensors and signals to determine humidity and then adjust the grille shutter system accordingly.

Furthermore, controller 12 may communicate with various actuators 32, which may include engine actuators (such as fuel injectors, an electronically controlled intake air throttle plate, spark plugs, etc.), cooling system actuators (such as air handling vents and/or diverter valves in the passenger compartment climate control system, etc.), and others. In some examples, the storage medium may be programmed with computer readable data representing instructions executable by the processor for performing the methods described below as well as other variants that are anticipated but not specifically listed.

As noted herein, the amount of waste heat transferred to the coolant from the engine may vary with operating conditions, thereby affecting the amount of heat transferred to the airflows. For example, as engine output torque, or fuel flow, is reduced, the amount of waste heat generated may be proportionally reduced.

Motor vehicle 102 further includes a grille 112 providing an opening (e.g., a grille opening, a bumper opening, etc.) for receiving air flow 116 through or near the front end of the vehicle and into the engine compartment. Such air flow 116 may then be utilized by radiator 80 and other components to keep the engine and/or transmission cool. Further, the air flow 116 may reject heat from the vehicle air conditioning system and can improve performance of turbo charged/super charged engines that are equipped with CAC 18 that reduces the temperature of the air that goes into the intake manifold/engine. FIG. 2 shows an example of the CAC 18, radiator 80, and engine system 100 locations within a vehicle 102 with respect to the grille shutters and associated ambient air flow 116. Other under hood components (fuel system, batteries, etc.) may benefit from the cooling air flow as well. Thus, grille shutter system 110 may assist cooling system 104 in cooling internal combustion engine 10. Grille shutter system 110 comprises one or more grille shutters 114 configured to adjust the amount of air flow received through grille 112.

Grille shutters 114 may cover a front region of the vehicle spanning from just below the hood to the bottom of the bumper, for example. By covering the CAC intake, drag is reduced and entry of external cooling air into the CAC is reduced. In some embodiments, all grille shutters may be moved in coordination by the controller. In other embodiments, grille shutters may be divided into sub-regions and the controller may adjust opening/closing of each region independently. For example, a first region may include grille shutters that largely affect drag while another affects entry of air into the CAC. In one example, the first sub-region may span from just below the hood to the top of the bumper, while the second sub-region may span from the top of the bumper to the bottom of the bumper. Each sub-region may contain one or more grille shutters. In some examples, each region may contain the same number of grille shutters, while in other examples one sub-region contains more than the other. In one embodiment, the first sub-region may contain multiple grille shutters, while the second sub-region contains one grille shutter. In an alternate embodiment, the first sub-region may only contain one grille shutter, while the second sub-region contains multiple grille shutters.

Grille shutters 114 are moveable between an opened position and a closed position, and may be maintained at either position or a plurality of intermediate positions thereof. In other words, opening of grille shutters 114 may be adjusted such that grille shutters 114 are opened partially, closed partially, or cycled between an opened position and a closed position to provide air flow for cooling engine compartment components at the least loss in fuel economy. This is because closing and/or partially closing grille shutters 114 reduces an amount of air flow received through grille 112, thus reducing the aerodynamic drag on the vehicle. Maintaining the grille shutters in an open position allows for sufficient engine cooling; however, this may also increase drag on the vehicle and decrease fuel economy. On the other hand, closing the grille shutters decreases drag and improves fuel economy; however, this may not allow for sufficient engine cooling. Thus, control of the grille shutters may be based on multiple vehicle operating conditions, discussed further below. In some embodiments, the grille shutters may be used for CAC condensate control only. In this case, grille shutter operation may have little to no aerodynamic benefit.

In some embodiments, control system 28 may be configured to adjust opening of grille shutters 114 responsive to vehicle operating conditions. Adjusting opening of grille shutters 114 may include opening one or more of the grille shutters, closing one or more of the grille shutters, partially opening one or more of the grille shutters, partially closing one or more of the grille shutters, adjusting opening and closing timing, etc. As an example, controller 12 may be communicably connected to grille shutter system 110, and may have instructions stored thereon to adjust opening of grille shutters 114.

Grille shutters may be adjusted in response to a variety of system variables, including engine temperatures, vehicle driving conditions, condensate formation in the CAC, and outside weather conditions. Opening one or more grille shutters may be in response to one of the above variables, even if other variables remain within a normal range. In this way, all variables may be assessed to determine the optimal grille shutter opening for vehicle cooling, CAC corrosion prevention, misfire prevention, and increased fuel economy.

Under some conditions, the grille shutter system 110 may be adjusted responsive to vehicle driving conditions, such as whether the vehicle is in a driven or a non-driven condition. The driven condition may include when the wheels are applying positive force propelling the vehicle forward. The non-driven condition may include when the wheels are absorbing vehicle inertia and generating a negative force against forward vehicle motion. In one embodiment, the non-driven vehicle condition may include a deceleration condition, a braking condition, a tip-out condition, a combination thereof, or another type of condition signaling that a non-driven vehicle condition is occurring, or about to occur. For example, an automatic cruise control braking signal may also be used. Further still, global positioning signals may be used indicating a slower region ahead, a downgrade approaching, etc.

In some cases, during deceleration, the vehicle may be shut down and the transmission disconnected from the engine to improve fuel economy. In this situation, additional cooling of the engine is needed. Opening of the grille shutters at the beginning of deceleration in this case may allow for pre-cooling of the engine, keeping engine temperatures low. This may also allow the grille shutters to remain closed for a longer period during the following driven conditions, reducing vehicle drag and again improving fuel economy.

Further, grille shutter system 110 may be adjusted to alter condensate formation within the CAC 18. A plurality of sensors 30 and controller 12 track the location of the dew point within the CAC 18, as well as other corrosion risk factors (such as time at dew point at one position within the CAC). Thus, in one example, one or more grille shutters may be adjusted in response to the dew point stagnating at a specific location for too long. By adjusting the grille shutters in this way, is possible to move the dew point to another location in the CAC 18 to reduce corrosion. For example, if the dew point has been hovering at one location in the CAC longer than a pre-determined time limit, grille shutters 114 can change position in order to alter the effectiveness of the CAC 18. This moves the dew point location. Further illustration of this is shown in FIG. 3 and is described below. The position of grille shutters 114 may be further altered by current or forecasted weather conditions. For example, adjusting closing of one or more of the grille shutters 114 can be in response to condensate-forming weather conditions. Condensate-forming weather conditions may include rain, humidity, cool temperatures, or a combination thereof. The weather conditions may be provided via the in-vehicle communications and entertainment system 26 or GPS 34.

Further, in some embodiments, the amount of adjustment of grille shutters 114 may depend on the degree of the non-driven vehicle condition, location of the dew point, or degree of condensate-forming weather conditions, and combinations thereof. For example, during greater deceleration, a degree of opening of grille shutters 114 may be increased and/or a timing of opening the grille shutters 114 may be made earlier, allowing for greater air flow to assist in cooling the engine so that subsequent acceleration with the grille shutters closed can be prolonged. As another example, if the GPS 34 or in-vehicle communications and entertainment system 26 predicts a small amount of rainfall and only moderately-humid conditions, an opening of the grille shutters 114 may be reduced.

Moreover, in some embodiments, grille shutter system 110 may be adjusted based on engine temperature, a non-driven vehicle condition, and condensate formation within the CAC 18. In one example, controller 12 may be configured to monitor engine temperature, for example, monitoring a coolant temperature and comparing it to threshold values. Additional methods of adjusting grille shutter system 110 are described in more detail with reference to FIGS. 4-6. Adjusting grille shutters in this way provides sufficient engine cooling, while reducing vehicle drag, reducing condensate formation, and avoiding stagnation of the dew point in the CAC. This may help to increase vehicle fuel economy and prevent corrosion of the CAC and engine misfire.

FIG. 3 shows a schematic example of the dew point location and movement within the CAC. Two CAC examples are shown at 300 with varying amounts of condensate. In the first CAC 302, hot charge air from the compressor 306 enters the CAC, cools as it travels through the CAC, and then exits 310 to pass though the throttle valve 20 and into the engine intake manifold 22. Ambient air flow 308 enters via the grille shutter openings and passes across the CAC, in the lateral direction, to aid in cooling the charge air. The dew point location 312 is near the proximal end of the CAC. A highly concentrated water and acid solution may form at this point, presenting largest significant corrosion risk. Downstream of the dew point location 312, a relatively large amount of condensate 314 forms in the CAC 302. By adjusting the position of the grille shutters 114, the ambient air flow 308 is altered, thus changing the effectiveness of the CAC and moving the location of the dew point. In the example of CAC 302, closing one or more of the grille shutters results in decreased ambient air flow 308, decreasing the cooling effectiveness of the CAC 302, and moving the dew point downstream, in the horizontal direction. The new dew point location 316 is shown in CAC 304. Charge air temperatures are warmer in this case, decreasing the amount of condensate 318 in the CAC 304.

Various approaches may be used to control the grille shutters. As described further with regard to FIG. 3, the grille shutters may be adjusted based on condensate location in a CAC. For example, if the dew point location in a CAC remains within a positional range along the horizontal axis for greater than a threshold duration, then the grille shutter position may be adjusted to move the condensate location depending on various factor, as described herein. This positional range may be adjusted based vehicle operating conditions. For example, if engine temperatures are high and require the grille shutters to be open more often, then this positional range may be increased to allow for additional engine cooling. On the other hand, if the ambient air temperature is low or it is currently raining, then this positional range may be decreased to prevent corrosion of the CAC. The threshold duration described above may be an amount of time, a number of miles, a number of engine revolutions, or another measurable parameter.

With regard to FIG. 3, the control system 28 may calculate the dew point location, determine which direction it is desirable to move along the horizontal axis, and in response, adjust the position of the grille shutters. For example, if the dew point is to the left of a designated center position, grille shutters may be closed to decrease cooling and move the dew point to the right 322. Conversely, if the dew point is to the right of the designated center position, grille shutters are opened to increase cooling and move the dew point to the left 320. In this way, by moving the dew point to the right and causing grille shutters to open, increased engine cooling also occurs. By moving the dew point to the left and causing grille shutters to close, vehicle drag is reduced, improving fuel economy. Thus, control of the grille shutters in this way may reduce degradation of the CAC while at the same time improve fuel economy and aid in engine cooling.

Figure 4:
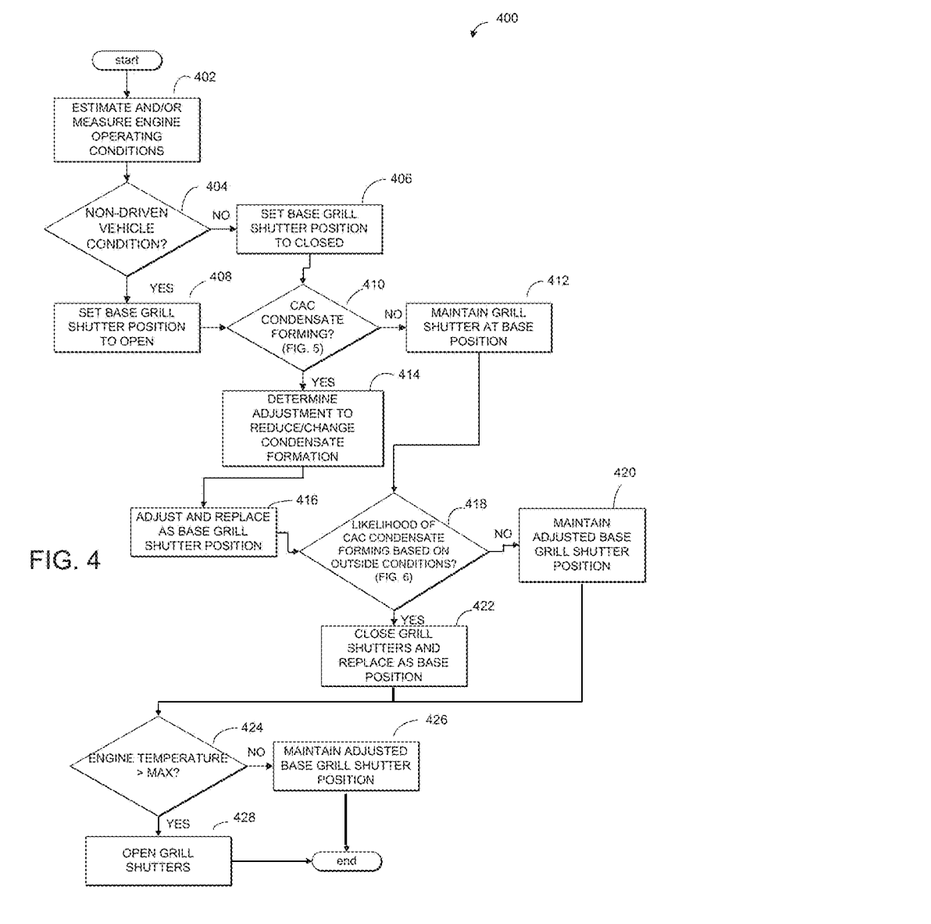
FIG. 4 shows a high level flow chart of a method for adjusting grille shutter position based on a non-driven vehicle condition, condensate formation in the CAC, outside weather conditions, and engine temperatures.

Now turning to FIG. 4, an example method 400 is shown for adjusting grille shutter position based on a non-driven vehicle condition, condensate formation in the CAC, outside weather conditions, and engine temperatures. At 402, the routine includes estimating and/or measuring engine operating conditions. These include, for example, engine speed and load, torque demand, boost, manifold pressure (MAP), manifold aircharge temperature (MCT), air-fuel ratio (lambda), fuel alcohol content, barometric pressure, ambient conditions (e.g., ambient air temperature, pressure, humidity, etc.), engine pre-ignition history, etc. At 404, based on the estimated conditions, it may be determined if there is a non-driven vehicle condition. Such a determination may include detecting a non-driven vehicle condition such as a deceleration condition, a braking condition, a tip-out condition, a rate of change of engine speed being less than a predetermined threshold, a braking signal from an adaptive cruise control system (that senses a distance to a vehicle directly in front of the present vehicle and automatically actuates vehicle brakes to maintain a threshold separation from the preceding vehicle), or another type of condition signaling a non-driven vehicle condition. As an example, the non-driven vehicle condition may be when the depression amount of the driver's braking pedal is greater than a threshold value. As another example, the non-driven vehicle condition may be when the driver's braking effort (e.g., a force on the braking pedal) is greater than a threshold value. As yet another example, the non-driven vehicle condition may be when the brake pressure is greater than a threshold value. As even another example, the non-driven vehicle condition may be when the actuation degree of the vehicle brakes (e.g., electrically actuated brakes) is greater than a threshold value.

If the vehicle does not have a non-driven vehicle condition (e.g., the vehicle is being driven), then method 400 proceeds to 406 and the controller sets the base grille shutter position to closed. However, if the vehicle does have a non-driven vehicle condition, then method 400 proceeds to 408 and the controller sets the base grille shutter position to open. From both 406 and 408, method 400 continues to 410 where condensate formation in the CAC is assessed. This method is expanded upon in FIG. 5, discussed below. If it is determined at 410 that condensate is not forming, then method 400 proceeds to 412 to maintain grille shutter position at the base position. However, if it is determined at 410 that condensate is forming, method 400 proceeds to 414 to determine the adjustment to the grille shutters required to reduce or change condensate formation. At 416, this adjustment is made and the new position is set as the base grille shutter position. The routine at 418 determines the likelihood that condensate will form in the CAC, based on outside weather conditions. This method is expanded upon in FIG. 6, explained further below. If, based on weather conditions, it is not likely for CAC condensate to form, the grille shutters are maintained at the adjusted base position. However, if condensate will likely form, the grille shutters are closed, replacing the old base position. Method 400 continues on to 424 to check engine temperatures in relation to threshold values. For example, if the engine coolant temperature (ECT) increases above a maximum value, engine cooling assistance is required. If these temperatures are not above a threshold value, then the grille shutter position is maintained at the adjusted base position and the routine ends. However, if temperatures are above the threshold values, the grille shutters are opened and the routine ends.

Figure 5:
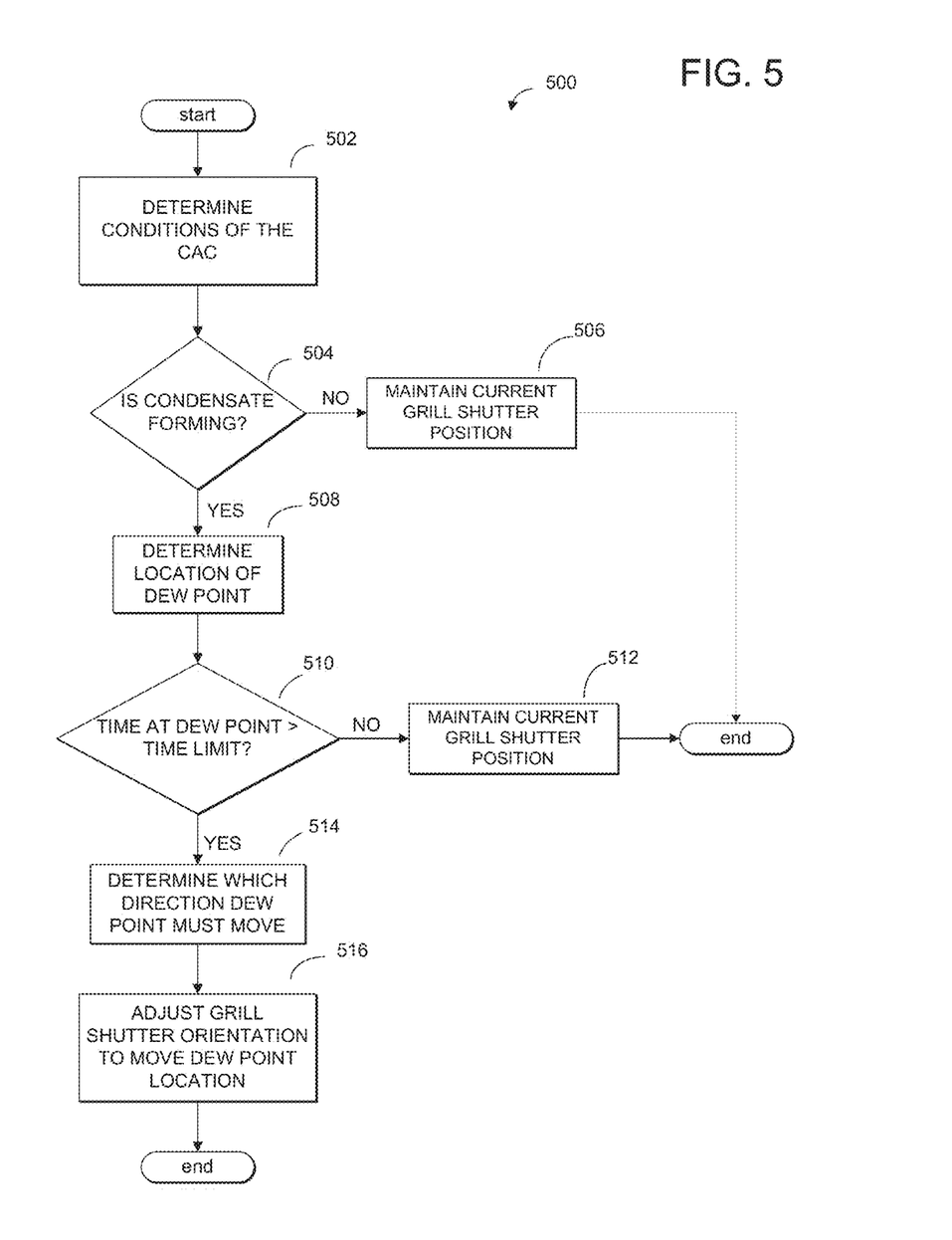
FIG. 5 shows a flow chart of a method for adjusting grille shutter position based on condensate formation within the CAC.

An example method 500 is shown in FIG. 5 for adjusting grille shutter position based on condensate formation within the CAC. At 502, the routine determines the conditions of the CAC. This may include retrieving details such as ambient air temperature, ambient air humidity, inlet and outlet charge air temperature, and inlet and outlet charge air pressure from a plurality of sensors 30. These variables are used at 504 to determine if condensate if forming in the CAC. If condensate is not forming, the method maintains the current grille shutter position and then ends. However, if condensate is forming, the method continues to 508 to determine the dew point location within the CAC. The controller 12 may determine dew point location by analyzing the conditions of the CAC, as described above, as well as other variables (such as vehicle speed, fan speed, grille shutter position, etc.). The controller may use algorithms to analyze data and determine the location of the dew point, the amount of time the dew point has stayed at that position, the amount of condensate within the CAC, and other values. If the time at the dew point is over a set time limit, then the method at 514 determines which direction the dew point moves (as described above and illustrated in FIG. 3). At 516, the controller 12 and actuators 32 adjust the grille shutter orientation to move the dew point to the desired location. After the grille shutters have been adjusted, the routine ends.

Figure 6:
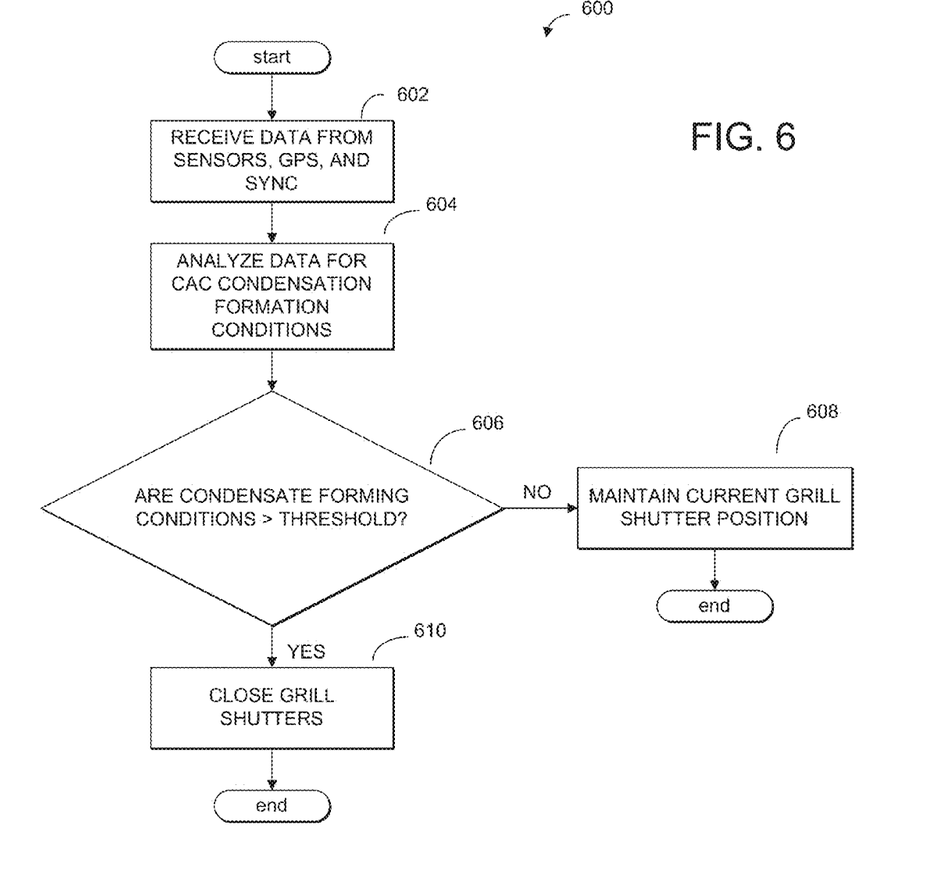
FIG. 6 shows a flow chart of a method for adjusting grille shutter position based on condensate forming conditions determined from outside weather conditions.

Turning to FIG. 6, an example method 600 is shown for adjusting grille shutter position based on condensate forming conditions determined from outside weather conditions. At 602, the controller 12 receives data from a plurality of sensors 30, a GPS 34, and the in-vehicle communications and entertainment system 26. The retrieved data may include ambient air temperature and humidity and forecasted weather conditions for the road ahead or along the vehicle's trip plan. The controller 12 then analyzes the data for CAC condensation formation conditions at 604. These conditions may include rain, high humidity, low air temperature, or a combination thereof. If it is determined at 606 that condensate forming conditions are above threshold values, then grille shutters are closed. Otherwise, the method maintains the current grille shutter position. Threshold values may include a set temperature, humidity percentage, or precipitation amount in which condensate is likely to form within the CAC. After 610 and 608, the routine ends.

Figure 7:
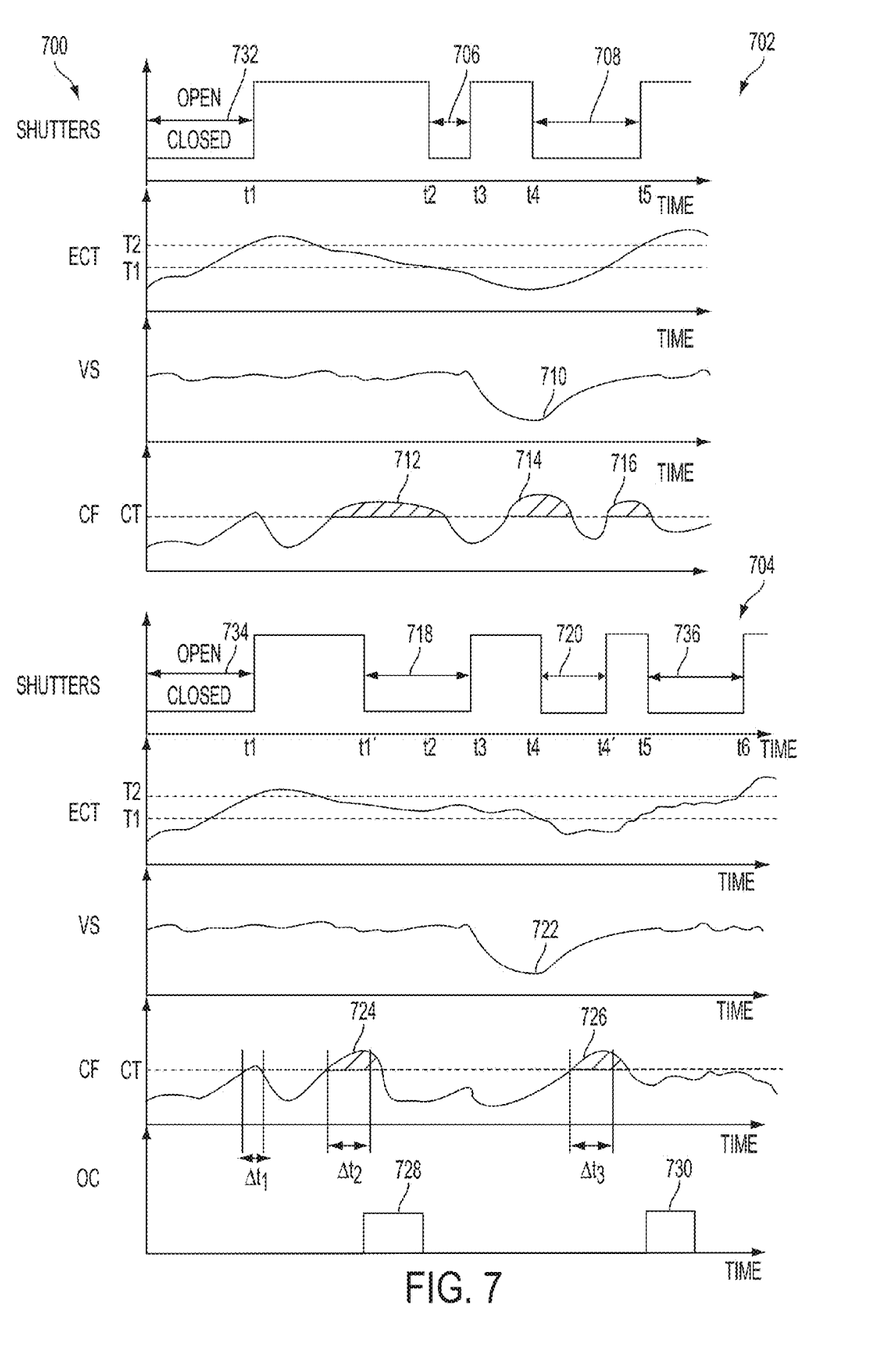
FIG. 7 shows a graphical example comparison of grille shutter operation due to engine coolant temperature, vehicle speed, condensate formation, and outside weather conditions.

FIG. 7 shows a graphical example comparison 700 of grille shutter operation due to engine coolant temperature, vehicle speed, condensate formation, and outside weather conditions. The example shows a comparison of graph 702 and 704 for a vehicle speed (VS) and outside weather conditions (OC) scenario as a function of time. Graph 702 illustrates a first example operation of grille shutters independent of condensate formation (CF). Opening and closing of the grille shutters is based on engine temperature and a non-driven vehicle condition, represented in this figure as an engine coolant temperature (ECT) and vehicle speed, respectively. Alternatively, graph 704 illustrates a second example of an adjustable grille shutter system wherein operating of grille shutters is based on engine coolant temperature, vehicle deceleration, condensate formation, and outside weather conditions.

With regard to graph 702, the CF curve reaches a threshold just before time $t_1$. However, the engine coolant temperature exceeds a threshold value $T_2$ at this point, causing the grille shutters to open. This causes the CF curve to dip down below the CT line before corrosion risk conditions are reached. The shutters remain open and condensate formation increases over the CT line until, at time $t_2$, the engine coolant temperature falls below another threshold value $T_1$. At time $t_3$, the vehicle speed indicates a vehicle deceleration or vehicle braking condition, signaling opening of the grille shutters. During this time, the engine coolant temperature drops further and condensate formation again rises above the CT line. At $t_4$, the vehicle accelerates, and due to increased condensate formation, the engine misfires at 710. As the vehicle continues to accelerate, engine coolant temperature increases, along with condensate formation. At time $t_5$, the grille shutters open after the engine coolant temperature reaches $T_2$.

With regard to graph 704, the grille shutters again open when the engine coolant temperature exceeds the threshold value $T_2$ at time $t_1$. As time goes on, condensate formation increases above threshold CT. The shutters remain open until time $t_1'$, when the CF curve has remained above CT for the set time limit, $\Delta t_2$. The grille shutters close at $t_1'$, allowing condensate formation to decrease again. Between $t_1'$ and $t_3$, the outside weather conditions change to that which will likely form condensate. Since the grille shutters are already closed, they remain closed at 728. Grille shutters open again at $t_3$, in response to vehicle deceleration, and remain open until $t_4$ when the vehicle accelerates. It is important to note that engine misfire does not occur at 722 in this example since condensate within the CAC was kept low due to earlier changes in grille shutter position. At time $t_4'$, grille shutters open again in response to the CF curve increasing above CT for the set time limit, $\Delta t_a$. At $t_5$, the outside weather conditions again change to that which will likely form condensate. This causes the grille shutters to close at 730. Grille shutters stay closed while engine coolant temperature slowly increases to $T_2$ at time $t_6$, causing grille shutters to open for the last time.

In comparing 702 and 704, differences in condensate formation within the CAC are seen. The CF curve increases above the condensate threshold four times in graph 702, three of which present significant corrosion risk to the CAC (712, 714, and 716). However, in graph 704, the time the CF curve spends above the condensate threshold is reduced (724 and 726). Thus, controlling grille shutters in response to condensate formation and outside weather conditions reduces the risk of corrosion and condensate formation within the CAC. The grille shutters also spend more time closed in 704 (718, 720, 734 and 736) than in 702 (706, 708, and 732). This reduces the aerodynamic drive on the vehicle, improving fuel economy.

As described above, grille shutter orientation may be controlled in response to engine temperatures, vehicle driving conditions, condensate formation in the CAC, and outside weather conditions. Grille shutters are opened, cooling engine system components, if the dew point within the CAC needs to move to the left, if engine temperatures are high, or if there is a non-driven vehicle condition, such as deceleration. Grille shutters are closed, cutting off cooling air flow, if the dew point in the CAC needs to move to the right, if there are condensate-forming weather conditions, or if the vehicle is being driven. Controlling grille shutters in this way allows for adequate engine cooling, while optimizing vehicle fuel economy, preventing engine misfire, and preventing CAC corrosion.

As will be appreciated by one of ordinary skill in the art, routines described herein may represent one or more of any number of grille shutter adjustment controls. As such, various steps or functions illustrated may be performed in the sequence illustrated, in parallel, or in some cases omitted. Likewise, the order of control is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for controlling vehicle grille shutters, comprising:
increasing a grille shutter opening to move a condensate location where condensate forms within a charge air cooler (CAC) toward an inlet of the CAC in response to the condensate location being closer to an outlet than the inlet; and decreasing the grille shutter opening to move the condensate location toward the outlet of the CAC in response to the condensate location being closer to the inlet than the outlet.

2. The method of claim 1 wherein increasing the grille shutter opening to move the condensate location toward the inlet includes increasing the grille shutter opening in response to the condensate location remaining within a positional range for greater than a threshold duration, the positional range being to a right of a center position of the CAC.

3. The method of claim 2 wherein decreasing the grille shutter opening to move the condensate location toward the outlet includes decreasing the grille shutter opening in response to the condensate location remaining within the positional range for greater than the threshold duration, the positional range being to a left of the center position of the CAC.

4. The method of claim 3 further comprising increasing the grille shutter opening to move the condensate location toward the inlet when engine temperature is higher than a threshold.

5. The method of claim 4 further comprising decreasing the grille shutter opening to move the condensate location toward the outlet when the engine temperature is lower than the threshold.

6. The method of claim 3 wherein the positional range is increased in response to increased engine temperature.

7. The method of claim 1 wherein increasing the grille shutter opening to move the condensate location toward the inlet includes one or more of fully opening or partially opening the grille shutters, and decreasing the grille shutter opening to move the condensate location toward the outlet includes one or more of fully closing or partially closing the grille shutters.

8. The method of claim 1 further comprising increasing the grille shutter opening to move the condensate location toward the inlet when a driver tip-out occurs, and decreasing the grille shutter opening to move the condensate location toward the outlet during engine-driven vehicle acceleration.

9. The method of claim 1 further comprising adjusting the grille shutter opening in response to engine cooling parameters and a driver pedal tip-out.

10. The method of claim 1 further comprising boosting intake air upstream of the CAC.

11. The method of claim 1 further comprising directly injecting fuel into an engine of a vehicle.

12. A method for controlling vehicle grille shutters, comprising:
increasing a grille shutter opening to move a condensate-forming location within a charge air cooler (CAC) toward an inlet of the CAC in response to the condensate-forming location being to a right of a center of the CAC, and at least one of an engine temperature being above a threshold or vehicle deceleration conditions; and decreasing the grille shutter opening to move the condensate-forming location toward an outlet of the CAC in response to the condensate-forming location being to a left of the center of the CAC, and at least one of an engine temperature being below the threshold or vehicle acceleration conditions.

13. The method of claim 12 further comprising adjusting a grille shutter opening in response to ambient weather conditions as indicated by a communication system in a vehicle, the communication system receiving information from a source external to the vehicle.

14. The method of claim 13 wherein the ambient weather conditions include humidity of ambient air.

15. The method of claim 12 further comprising maintaining the grille shutters closed during the acceleration conditions, and wherein the grille shutters are fully opened during the deceleration conditions immediately preceding the acceleration conditions, even if the engine temperature is below the threshold.

16. The method of claim 15 further comprising adjusting the grille shutters responsive to an estimated amount of condensate formation in the CAC.

17. The method of claim 15 further comprising shutting down an engine during the deceleration conditions.

18. A method for controlling vehicle grille shutters, comprising:
adjusting a grille shutter opening in response to a condensate location within a charge air cooler remaining stagnant for greater than a threshold duration, including increasing the grille shutter opening and moving the condensate location toward an inlet of the charge air cooler in response to a first condition with the condensate location closer to an outlet of the charge air cooler than the inlet of the charge air cooler, and decreasing the grille shutter opening and moving the condensate location toward the outlet in response to a second condition with the condensate location being closer to the inlet than the outlet.

19. The method of claim 18 further comprising determining the condensate location by calculating a dew point location within the charge air cooler relative to a designated center position of the charge air cooler, the dew point location based on conditions of the charge air cooler.

20. The method of claim 18 further comprising adjusting the grille shutters in response to engine cooling parameters and a driver pedal tip-out and tip-in, wherein positional range is increased in response to increased engine temperature.

* * * * *